No. 879,698. PATENTED FEB. 18, 1908.
W. V. TURNER.
PRESSURE REDUCING VALVE.
APPLICATION FILED JULY 14, 1904.
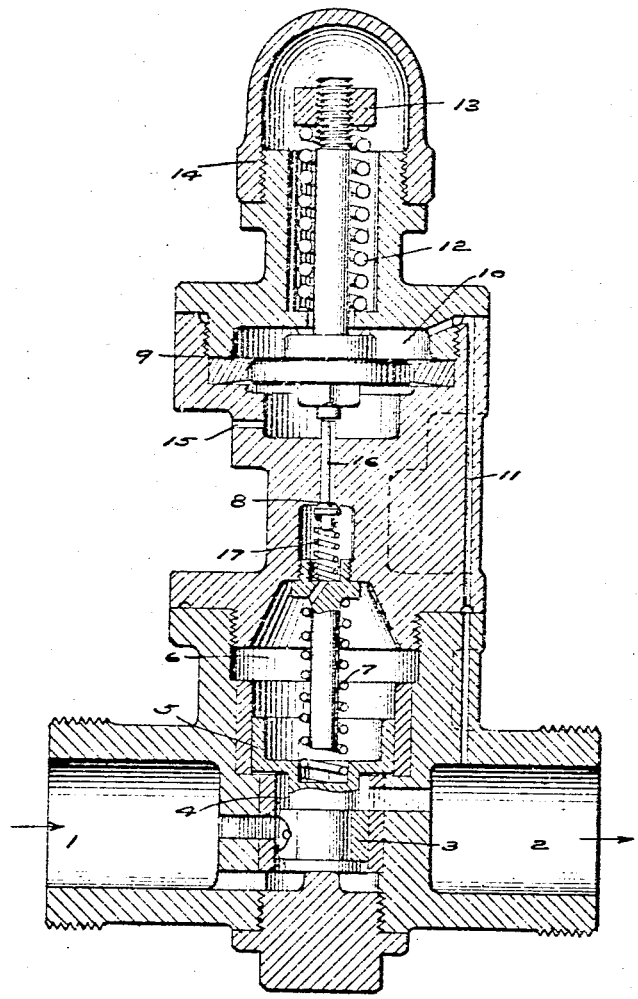

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

PRESSURE-REDUCING VALVE.

No. 879,698.     Specification of Letters Patent.     Patented Feb. 18, 1908.

Application filed July 14, 1904. Serial No. 216,517.

*To all whom it may concern:*

Be it known that I, WALTER V. TURNER, a citizen of the United States, residing in Wilkinsburg, county of Allegheny, and State of Pennsylvania, have invented a certain new and useful Improvement in Pressure-Reducing Valves, of which the following is a specification.

This invention relates to fluid pressure regulators or pressure reducing valve devices adapted to be located between a source of fluid supply and a pipe or chamber, wherein it is desired to maintain the fluid at a substantially constant degree of pressure which is less than that of the source of supply.

More particularly the invention relates to that class of these devices in which the main valve for controlling the flow of fluid is operated by a piston, the pressure upon one side of which is controlled by an auxiliary pressure device, such as a small valve and diaphragm which is subject to the pressure of the pipe or chamber in which the constant pressure is to be maintained on the outlet side of the main valve.

As applied to the regulation of certain fluids, such as air or steam for certain purposes where a slight leakage to the atmosphere is not objectionable, it is often desirable that the main valve should be normally open, that is when the fluid pressures upon opposite sides of the main piston are substantially equal and the pressure on the outlet side is less than that designed to be maintained. It is also desirable that when the pressure upon the outlet side rises to the desired degree for which the device is adjusted that the main valve should close positively and be held closed by the higher pressure of the inlet side or source of supply acting on one side of the main valve piston. According to my invention, these results are secured by providing a main valve and piston constantly subject upon one side to the high inlet pressure from the source of fluid supply which is adapted to leak around to the chamber on the opposite side of the piston from which a small vent to the atmosphere is controlled by an auxiliary valve and diaphragm subject to the pressure on the outlet side of the main valve.

In the accompanying drawing, which shows in section a valve device embodying my invention, the main valve chamber 4 is in constant open communication with the inlet 1 or source of supply, while the main valve 3, which is shown in the form of a slide valve, controls a port leading to the outlet 2.

The main valve is operated by the piston 5, which is subject to the inlet pressure upon the valve chamber side and to pressure of chamber 6 upon the opposite side, the chamber 6 being supplied with fluid from the inlet 1 by leakage around piston 5 and having a vent port 15 leading to the atmosphere controlled by auxiliary or regulating valve 8 actuated by diaphragm 9 through stem 16. The diaphragm chamber 10 communicates through port or passage 11 with the outlet side 2 of the main valve and the pressure on said diaphragm is opposed by the spring 12 having adjusting nut 13, the chamber being closed by cap nut 14. When there is no pressure on the inlet side of the valve, or when the main piston is balanced as to fluid pressure upon its opposite sides, the spring 7 normally holds the main valve wide open and this comprises one of the important features of my invention.

The operation of my improved fluid pressure regulator is as follows: When the pressure upon the outlet side is less than that for which the spring 12 is adjusted the diaphragm stem is held above the stem 16 and the regulating or vent valve 8 is held closed by means of a light spring 17 and the fluid pressure in chamber 6. This chamber being closed the pressure from the inlet 1 readily equalizes around the piston 5, so that the same is balanced as to fluid pressure and the spring 7 holds the main valve open, thereby feeding up the pressure in the chamber at the outlet 2 and also through passage 11 into the diaphragm chamber 10. When this pressure has increased to a degree sufficient to compress the spring 12 the regulating or vent valve 8 is opened slightly by the stem 16 and fluid from chamber 6 escapes through port 15 to the atmosphere. As it requires only a slight opening of valve 8 to vent fluid from chamber 6 to the atmosphere faster than it can be supplied by leaking around the piston 5, the high pressure upon the inlet side immediately predominates and forces the piston up against the spring 7, thereby closing the main valve quickly and positively. As long as the pressure upon the outlet side remains at the desired degree the valve 8 stands slightly open and there is a slight leakage from the inlet around piston 5 to chamber 6 and out through valve 8 and port 15 to the atmosphere, the main valve being held closed by the inlet pressure acting on the piston 5. When the pressure upon the outlet side falls below the desired degree the spring 12 raises the diaphragm stem from the stem 16 and allows the regulating or vent valve 8 to close. The inlet pressure then immediately equalizes upon opposite sides of the piston 5 and the spring 7 opens the main valve. If for any reason the inlet pressure should fail or become reduced below that upon the outlet side as determined by the spring 12, the main valve is held open by the spring 7 since the piston 5 remains balanced as to fluid pressure and the fluid is then free to flow back through the valve from the outlet side to the inlet side without raising the valve from its seat, which is an important and desirable feature, especially when used in connection with a slide valve.

In certain applications of a valve device of this character, as for instance in an air brake system, it is desirable that the main valve should remain substantially wide open, when the outlet side is being recharged, until the outlet pressure has increased to about the point at which the spring is adjusted, and then be quickly and positively closed.

The important features of my invention whereby their advantageous results are obtained, comprise the venting of the pressure chamber 6 to the atmosphere, whereby the fluid may discharge rapidly from said chamber whenever the regulating or vent valve 8 is open, the vent valve being adapted to be opened by the diaphragm when the outlet pressure has risen to the predetermined amount whereby the main valve is held in its closed position by the preponderance of pressure upon the inlet side of the main valve piston.

Having now described my invention, what I claim as new and desire to secure by Letters Patent is:

1. A fluid pressure regulator comprising a main valve for controlling the flow of fluid, a movable abutment having equal areas exposed to fluid pressure on its opposite sides for operating said valve, a spring normally tending to move said valve to its open position, and a regulating valve operated by variations in the fluid pressure for controlling the release of fluid from one side of said abutment.

2. A fluid pressure regulator comprising a main valve for controlling the flow of fluid, a movable abutment having equal areas exposed to fluid pressure on its opposite sides for operating said valve, a spring normally tending to move said valve to its open position, a regulating valve for controlling the pressure on one side of said abutment, and means governed by the outlet pressure for operating said regulating valve.

3. A fluid pressure regulator comprising a main slide valve for controlling the flow of fluid, a movable abutment having equal areas exposed to fluid pressure on its opposite sides for operating said valve, means normally tending to open said valve, a regulating valve controlling the pressure on one side of said abutment, and means governed by the outlet pressure for operating the regulating valve.

4. A fluid pressure regulator comprising a main slide valve for controlling the flow of fluid, a movable abutment having equal areas exposed to fluid pressure on its opposite sides for operating said valve, a spring normally tending to open said valve, a regulating valve for controlling the release of fluid from one side of the abutment, and a diaphragm subject to the opposing pressures of the outlet fluid and an adjustable spring for operating said regulating valve.

5. A fluid pressure regulator comprising a main slide valve subject to the high pressure for controlling the flow of fluid, a piston also exposed on one side to the high pressure for operating said valve, means for permitting a leakage of fluid to the piston chamber on the opposite side, a spring normally acting to move said slide valve to its open position, a regulating or vent valve for controlling the release of fluid from the piston chamber, and means governed by the outlet pressure for operating the regulating valve.

6. A pressure reducing valve comprising a main valve, a piston subject on one side to the inlet pressure for closing said valve, means for permitting an equalization of the pressure around said piston, a spring for normally holding the main valve open, a vent valve for releasing fluid from the opposite side of said piston to the atmosphere, a spring acting on said vent valve and means governed by the outlet pressure for operating said vent valve.

7. A pressure reducing valve comprising a main valve and piston subject on one side to the inlet pressure for closing said valve, means for permitting an equalization of pressure around said piston, a device normally tending to hold said valve in its open position, a vent valve for releasing fluid from the opposite side of the piston, a spring acting on said vent valve and a diaphragm subject to the outlet pressure for controlling said vent valve.

In testimony whereof I have hereunto set my hand.

WALTER V. TURNER.

Witnesses:
R. F. EMERY,
JAS. B. MACDONALD.